United States Patent [19]

Klein

[11] 3,959,870
[45] June 1, 1976

[54] CONTINUOUS MOTION ASSEMBLY MACHINE

[75] Inventor: Edward I. Klein, Montreal, Canada

[73] Assignee: V-Mark Automation Ltd., Montreal, Canada

[22] Filed: Mar. 5, 1975

[21] Appl. No.: 555,638

[52] U.S. Cl. ............................ 29/208 R; 29/211 R
[51] Int. Cl.² ........................................ B23P 19/04
[58] Field of Search ............ 29/203 S, 208 R, 211 R

[56] References Cited
UNITED STATES PATENTS

| 2,914,781 | 12/1959 | Prutton | 29/211 R X |
| 3,142,078 | 7/1964 | Pipes | 29/208 R X |
| 3,212,114 | 10/1965 | Pipes | 29/208 R X |
| 3,501,826 | 3/1970 | Marcus | 29/208 R X |

FOREIGN PATENTS OR APPLICATIONS

| 2,017,459 | 10/1971 | Germany | 29/208 R |
| 860,039 | 2/1961 | United Kingdom | 29/211 R |

Primary Examiner—Victor A. DiPalma
Attorney, Agent, or Firm—Alan Swabey; Melvin Sher

[57] ABSTRACT

The invention relates to a continuous motion assembly apparatus for assembling multipart devices, such as ball point pens, lipstick cases, syringes, etc., said multipart devices comprising a main part and at least one further part. Present automatic assembly apparatus for such devices require that the apparatus be stopped for each assembly operation. This start and stop motion limits the speed, and thus the production rate, of the apparatus. In accordance with the instant invention, the assembly apparatus is performed in a continuous motion. An apparatus in accordance with the invention comprises: a first conveyor to bring the main parts, one at a time, to an assembly station. A second conveyor brings a further part to the assembly station, and means are provided at the assembly station to mount the further part on the main part by a continuously variable amount. The means can comprise a rod and carrier arrangement acting in conjunction with a cam which forces the rod in a desired direction. The rod, in turn, pushes one of the parts in the same direction to mount it on the other part.

4 Claims, 3 Drawing Figures

CONTINUOUS MOTION ASSEMBLY MACHINE

BACKGROUND OF THE INVENTION

1. Field of the Invention

The invention relates to a continuous motion assembly apparatus. More specifically, this invention relates to an apparatus for assembling devices comprising a plurality of parts wherein one of the parts is mounted on another one of the parts by a continuously variable amount.

2. Description of Prior Art

Automatic assembly apparatus for assembling multi-part devices, such as ball point pens, lipstick cases, syringes, etc., are well known. Such devices are usually made up of a main part and further parts assembled with the main part to make up the device, and in the known apparatus, the parts to be assembled are conveyed to an assembly station, the conveyor system is stopped, the parts are assembled, and the conveyor system starts up again to bring the assembled part to a further assembly station where further parts are added. The different parts may be carried by different conveyors, in which case, all the conveyors will have to be stopped for all assembly activities.

For example, in assembling a non-retractable ball point pen, the pen barrel would be the main part, and this would be brought to an assembly station by a conveyor. The nib and ink carrying arrangement would also be brought to this station by a conveyor, or it may be dispensed there by a dispenser unit. While the nib is being inserted into the barrel, the conveyor or conveyors would have to be stopped. The assembled barrel and nib would then be conveyed to a second station to which end stoppers are also conveyed. Again, the conveyors must be stopped while the end stopper is mounted on the end of the barrel remote from the nib.

Of course, the various assembly activities will be taking place at the same time, i.e., while an end stopper is being mounted on barrel number 2, a nib is being inserted in barrel number 1, etc.

With the known apparatus, the motion between stations must be carefully indexed, i.e., it is critical that the end stopper which is to be mounted on a barrel be directly adjacent the barrel. This requires precision tooling and machining of the indexing means. In addition, the start and stop motion of the known apparatus limits the speed at which the apparatus can operate and, therefore, the production speed of the apparatus.

SUMMARY OF THE INVENTION

These and other disadvantages are overcome by providing a continuous motion assembly apparatus for assembling devices comprising a main part and at least one further part to be assembled. In accordance with the invention, the apparatus comprises a first conveyor means for conveying the main part to an assembly station; a second conveyor means for conveying said further part to the assembly station; and, means for mounting the further part on the main part by a continuously variable amount along the length of the assembly station. The mounting means can comprise a plurality of rod means acting in a direction perpendicular to the direction of travel of the first conveyor means. The rod means can be used in conjunction with a cam means which alters the direction of travel of the rod means along the length of the cam means.

BRIEF DESCRIPTION OF THE DRAWINGS

The invention will be better understood by an examination of the following description, together with the accompanying drawings, in which.

DETAILED DESCRIPTION OF THE DRAWINGS

Figure 1:
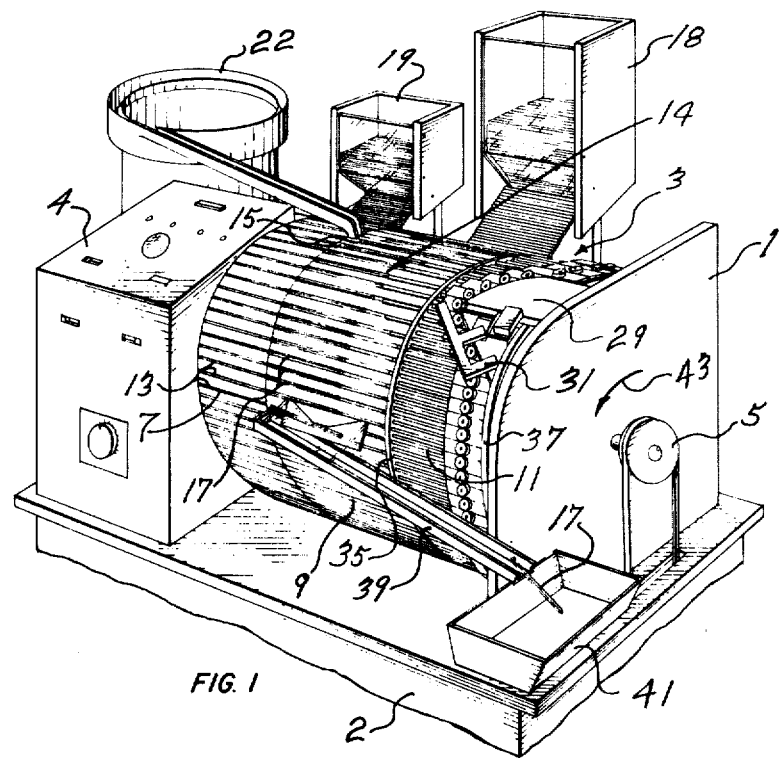
FIG. 1 is a perspective view of an apparatus in accordance with the invention.

Referring to the drawings, an apparatus in accordance with the invention comprises a side frame 1 mounted on a base 2. A rotatable drum, indicated generally at 3, is rotatably mounted, at one end thereof, on the frame 1 and at the other end thereof on a mounting means provided on container 4. Container 4 can also include control mechanisms and indicators, as is well known.

The drum is rotated by pulley 5 whose other end is connected to a motor (not shown). The drum is divided into three sections: a first outer end section 7 for receiving parts to be assembled; a center section 9, for receiving other parts to be assembled; and a second outer end section 11.

Figure 2:
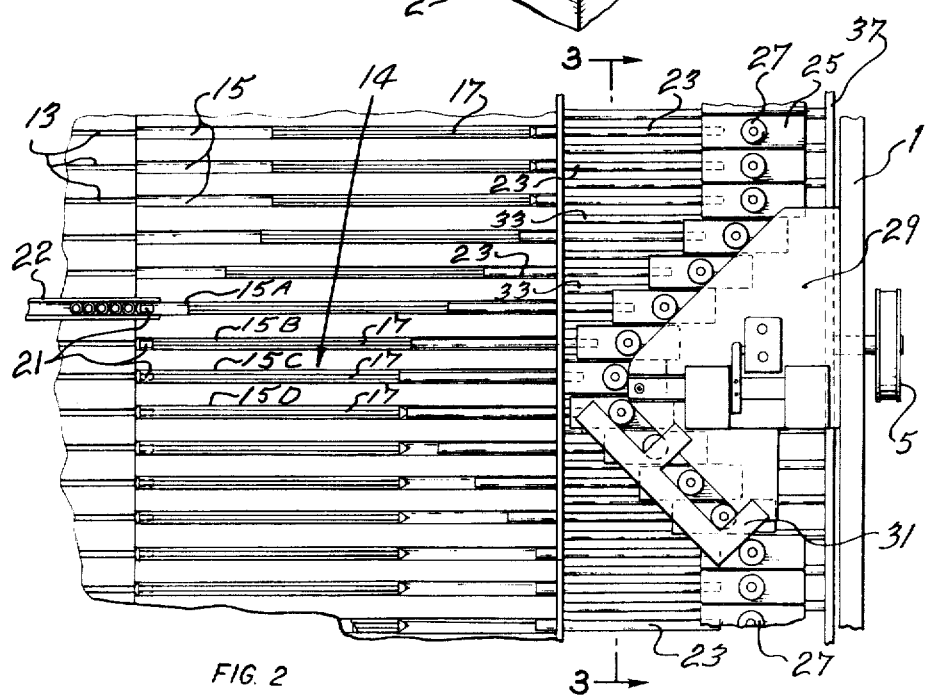
FIG. 2 is a developed view of a portion of FIG. 1 to illustrate details thereof.

Section 7 comprises a plurality of equally spaced grooves 13 running along the length of the drum. These grooves receive parts to be assembled and convey them to an assembly station, indicated generally at 14, as will be described below. Section 9 contains an equal plurality of equally spaced grooves 15 running along the length of the drum. As can be seen in FIGS. 1 and 2, each one of the grooves 13 is in alignment with a respective one of the grooves 15. Grooves 15 serve to convey a different one of the parts to be assembled to the assembly station 14.

The apparatus illustrated is used to assemble nonretractable ball point pens including a barrel 17 (the main part) which is dispensed to grooves 15 from barrel dispenser 18. Nib and ink carrying means are dispensed from dispenser 19 and are inserted into the barrels by means not shown in the drawings. End stoppers 21 (see FIG. 2) are dispensed from dispensing means 21 into grooves 15 for continuous mounting on the barrel. An arrangement for such continuous mounting constitutes the subject matter of the invention, and the arrangement illustrated in the drawings is representative of an operating arrangement in existence today. Thus, the arrangement constitutes a preferred embodiment of the invention.

Figure 3:
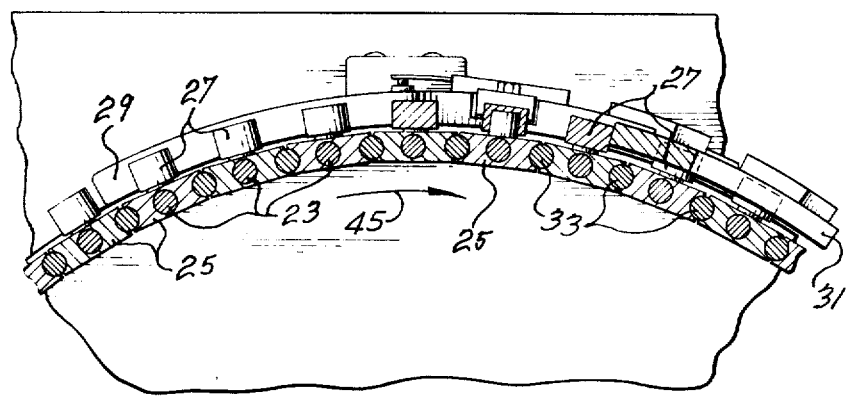
FIG. 3 is a section along 3—3 of FIG. 2.

The means for mounting end stoppers 21 on the barrels include a rod means including rod members 23, carrier means 25 for carrying the rod members, and guide rollers 27 mounted on the top surfaces of the carrier means. The carriers are guided in a direction towards section 9 by cam 29, and in a direction away from section 9 by the other end of the cam, operating in conjunction with guide means 31. Each of the carrier means is slidably mounted on a pair of guide rods 33 as is shown in FIGS. 2 and 3. The guide rods are fixed, at respective ends thereof, to circular plates 35 and 37 which are mounted on the drum 3 and rotatable therewith.

Chute 39 dispenses assembled pens to container 41.

In operation, the apparatus works as follows:

As grooves 13 and 15 are rotatable with the drum (they may be embedded in the drum), and as they rotate at the same rate, any groove 13 aligned with a groove 15 will remain aligned therewith throughout. In addition, each rod member 23 is aligned with a respective groove 15. As the plates 35 and 37 are rotatable with the drum, each rod member 23 will remain aligned with its respective groove 15.

The drum rotates in the direction shown by arrows 43 and 45 in FIGS. 1 and 3 respectively.

A different barrel 17 will be dispensed into a respective separate groove 15 as the respective groove passes under the outlet of dispenser 18. The barrel will then be carried around the drum, and a nib means will be inserted into the barrel by means not shown in the drawings. The barrel with the nib will then advance to the assembly station 14.

At the top end of the assembly station, the rod members are directed towards the left hand side of section 11 when the roller 27 of the carrier means 25 of the respective rod member engages the cam 29. As the top side of the cam is continuous, the motion of the rod member in a direction perpendicular to the direction of travel of section 9 of the drum is continuous, i.e., it does not consist of a series of discreet steps.

As the rod member moves to the left, it will engage the right hand end of a barrel in its adjacent groove 15 and it will force the barrel towards the left hand side of the groove 15.

When the respective groove 15 reaches the dispenser 22, an end stopper 21 is deposited in the groove. This occurs when the groove is in position 15A in FIG. 2. As can be seen, when the groove is in this position, the barrel is still far enough away from the left hand side of the groove to permit the end stopper to fall into the groove in its correct assembling attitude.

As the drum advances, the rod member moves further to the left and forces the left hand end of the barrel over the end stopper so that the end stopper is mounted on the barrel. The progression is illustrated with the groove in positions 15B to 15D. Although discreet steps are illustrated here, it will be appreciated that the actual mounting is a continuous process. At position 15D, the end stopper is completely mounted on the barrel, and the assembled device is at the extreme left hand side of the groove 15.

After the rod member passes the 15D position, it is guided back to the right hand end of section 11 by the combination of the guide means 31 and the far end of the cam 29. As is apparent from the drawings, the guide means 31 will engage the roller and force the rod means to travel in the direction of the inner edge of the guide means.

During the left-right and right-left motion of the carrier, the carrier slides along, and is guided by its respective pair of rods 33.

It will, of course, be appreciated that an assembly apparatus will normally comprise a plurality of assembly stations. Considering the example in the disclosure, a further assembly station would be required for mounting the caps on the pens. This assembly station would follow the station 14 in the drawings, and the caps would be dispensed into grooves 15 at the right hand end thereof. A rod and cam arrangement such as illustrated in the drawings would be included either at the right hand end of grooves 15, to push the caps on the barrels, or on the left hand end thereof, to push the barrels into the caps.

Alternatively, the cap could be mounted at the same assembly station by modifying the apparatus. Thus, rod member 23 would be made shorter so that the left hand end of the rod is spaced from plate 35 by a distance greater than the full length of the cap. A groove would extend under each rod member 23, and the rod member could be slidable in the groove. A cap would be dispensed into each groove in advance of the cam, and, as the rod members move to the left with the advance of the drum, the rod member would push the cap into engagement with, and finally onto, the barrel. At the same time, the other end of the barrel will be pushed onto the end stopper. Thus, when the groove reaches the end of station 14, both end stopper and cap would be mounted on the barrel.

The grooves for the caps would, of course, be in alignment with grooves 15.

It will be appreciated that, although a drum is used as a conveyor in the illustrated embodiment, it is not necessary to use such a conveyor means. Thus, the conveyor means can comprise an elongated endless belt-like arrangement, to provide a flat surface assembly station, or other means well known in the art.

Although only a single embodiment has been illustrated, this was for the purpose of describing, but not limiting the invention. Various modifications which will come readily to the mind of one skilled in the art are within the scope of the invention as defined in the appended claims.

I claim:

1. A continuous motion assembly apparatus for assembling devices, each said device comprising a main part and at least one further part to be assembled with said main part;

said apparatus comprising:
- a first surface movable in a first direction and comprising a plurality of slots extending in a direction perpendicular to said first direction, said slots being adapted to convey said main parts to an assembly station on said apparatus, one at a time;
- a second surface on one side of said first surface and movable in the same direction as said one surface, said second surface comprising a plurality of slots extending in a direction perpendicular to the direction of travel thereof, said slots being adapted to convey said one further part to said assembly station;
- a third surface on the other side of said first surface and movable in the same direction as said first surface, said third surface comprising a plurality of carrier means on the side of said third surface remote from said first surface and extending in a direction perpendicular to the direction of travel of said third surface, each said carrier comprising a rod member extending perpendicular to the direction of travel of said third surface, and in the direction of said first surface;
- said rod means having a direction of action perpendicular to the direction of travel of said third surface; and
- cam means, acting in conjunction with said carriers and said rod means, to alter the direction of said carriers from the direction perpendicular to the direction of action of said rod means to the direction of action of said rod means by continuously variable amounts along the length of the cam means.

2. An apparatus as defined in claim 1 wherein said first, second and third surfaces comprise, respectively, a middle, first outer end section, and second outer end section, of a rotatable drum means; and wherein said slots of said first section are alignable, respectively, with slots in said second section, and wherein said rod means are alignable, respectively, with said slots in said first section.

3. An apparatus as defined in claim 2, wherein each of said carrier means comprises roller means on a top surface thereof, said roller means being disposed on the top surface of said carrier means to engage said cam means as the respective carrier passes said cam means whereby said cam means guides said carrier means to alter the direction thereof; and further comprising roller guide means for engaging said roller to guide said carrier means to alter the direction of travel thereof from the direction of action of said rod means to a direction perpendicular to the direction of action thereof.

4. An apparatus as defined in claim 3, and further comprising an end plate on each end of said second end section, said end plates being rotatable with said drum means; and a plurality of equally spaced guide rods extending between said end plates along the length of said drum means;

each said carrier means being slidably mounted on two adjacent guide rods.

* * * * *